United States Patent
Kang et al.

(10) Patent No.: US 6,441,988 B2
(45) Date of Patent: *Aug. 27, 2002

(54) METHOD AND APPARATUS FOR REDUCING ACOUSTIC NOISE IN A HARD DISK DRIVE

(75) Inventors: Chang-Ik Kang; Kang-Seok Lee, both of Santa Clara, CA (US)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,884

(22) Filed: Oct. 7, 1998

(51) Int. Cl.[7] .............................................. G11B 5/596
(52) U.S. Cl. ................................ 360/78.06; 360/78.07; 360/78.09
(58) Field of Search .......................... 360/78.07, 78.06, 360/78.09, 78.04, 78.01, 78.14; 318/560, 561, 567

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. ............ 360/78.07 |
| 4,977,472 A | 12/1990 | Volz et al. |
| 4,982,295 A | 1/1991 | Yakuwa et al. |
| 5,036,408 A | 7/1991 | Leis et al. |
| 5,050,146 A * | 9/1991 | Richgels et al. ..... 360/78.06 X |
| 5,053,899 A | 10/1991 | Okawa et al. |
| 5,111,349 A * | 5/1992 | Moon ..................... 360/78.07 |
| 5,182,684 A * | 1/1993 | Thomaas et al. ........ 360/78.09 |
| 5,210,662 A | 5/1993 | Nishijima |
| 5,235,478 A | 8/1993 | Hoshimi et al. |
| 5,255,136 A | 10/1993 | Machado et al. |
| 5,291,110 A | 3/1994 | Andrews, Jr. et al. ...... 318/560 |
| 5,333,140 A | 7/1994 | Moraru et al. |
| 5,408,367 A | 4/1995 | Emo |

(List continued on next page.)

FOREIGN PATENT DOCUMENTS

| | | |
|---|---|---|
| EP | 0 601 855 A2 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| WO | WO 95/24035 | 9/1995 |
| WO | WO 96/23305 | 8/1996 |

*Primary Examiner*—Andrew L. Sniezek
(74) *Attorney, Agent, or Firm*—Irell & Manella, LLP; Jeffrey P. Aiello

(57) ABSTRACT

A hard disk drive which moves a transducer across a disk surface so that the transducer has an essentially sinusoidal acceleration trajectory. The transducer may be integrated into a slider that is incorporated into a head gimbal assembly. The head gimbal assembly may be mounted to an actuator arm which can move the transducer across the disk surface. The movement of the actuator arm and the transducer may be controlled by a controller. The controller may move the transducer from a first track to a new track in accordance with a seek routine and a servo control routine. During the seek routine the controller may move the transducer in accordance with a sinusoidal acceleration trajectory. The sinusoidal trajectory may reduce the high harmonics found in square waveforms of the prior art, and thus minimize the acoustic noise of the head gimbal assembly and reduce the settling time of the transducer for reducing the duration of the seek routine.

26 Claims, 4 Drawing Sheets

U.S. PATENT DOCUMENTS

| | | |
|---|---|---|
| 5,448,429 A | 9/1995 | Cribbs et al. |
| 5,450,249 A | 9/1995 | Nagaraj et al. |
| 5,452,285 A | 9/1995 | Monen |
| 5,453,887 A | 9/1995 | Negishi et al. |
| 5,465,034 A | 11/1995 | Andrews, Jr. et al. ...... 318/560 |
| 5,465,035 A | 11/1995 | Scaramuzzo, Jr. et al. .. 318/561 |
| 5,500,776 A | 3/1996 | Smith |
| 5,523,902 A | 6/1996 | Pederson |
| 5,570,247 A | 10/1996 | Brown et al. |
| 5,581,420 A | 12/1996 | Chainer et al. |
| 5,587,850 A | 12/1996 | Ton-that |
| 5,600,506 A | 2/1997 | Baum et al. |
| 5,606,469 A | 2/1997 | Kosugi et al. |
| 5,608,587 A | 3/1997 | Smith |
| 5,615,058 A | 3/1997 | Chainer et al. |
| 5,631,783 A | 5/1997 | Park |
| 5,640,423 A | 6/1997 | Archer |
| 5,657,179 A | 8/1997 | McKenzie ............... 360/78.06 |
| 5,659,436 A | 8/1997 | Yarmchuk et al. |
| 5,666,238 A | 9/1997 | Igari et al. |
| 5,680,270 A | 10/1997 | Nakamura |
| 5,680,451 A | 10/1997 | Betts et al. |
| 5,691,857 A | 11/1997 | Fitzpatrick et al. |
| 5,696,647 A | 12/1997 | Phan et al. ............... 360/78.07 |
| 5,710,677 A | 1/1998 | Teng et al. |
| 5,715,105 A | 2/1998 | Katayama et al. |
| 5,734,680 A | 3/1998 | Moore et al. |
| 5,748,677 A | 5/1998 | Kumar |
| 5,751,513 A | 5/1998 | Phan et al. ............... 360/78.07 |
| 5,760,992 A | 6/1998 | Phan et al. ............... 360/78.07 |
| 5,771,126 A | 6/1998 | Choi |
| 5,771,130 A | 6/1998 | Baker |
| 5,771,131 A | 6/1998 | Pirzadeh |
| 5,796,543 A | 8/1998 | Ton-That |
| 5,798,883 A | 8/1998 | Kim |
| 5,867,337 A | 2/1999 | Shimomura |
| 5,867,353 A | 2/1999 | Valent |
| 5,892,634 A | 4/1999 | Ito et al. |
| 5,901,009 A * | 5/1999 | Sri-Jayantha et al. .... 360/78.07 |
| 5,917,670 A | 6/1999 | Scaramuzzo et al. |
| 5,936,792 A * | 8/1999 | Kobayashi et al. ...... 360/78.07 |
| 5,946,157 A | 8/1999 | Codilian et al. |
| 6,031,684 A * | 2/2000 | Gregg ...................... 360/78.06 |
| 6,118,616 A * | 9/2000 | Jeong ................. 360/77.08 X |
| 6,140,791 A * | 10/2000 | Zhang ........................ 318/632 |
| 6,178,060 B1 * | 1/2001 | Liu ......................... 360/78.07 |

\* cited by examiner

METHOD AND APPARATUS FOR REDUCING ACOUSTIC NOISE IN A HARD DISK DRIVE

BACKGROUND OF THE INVENTION

1. Field of the Invention

The present invention relates generally to firmwave associated with a hard disk drive and more particularly to a method and apparatus for reducing the acoustic noise generated by movements of data read/write componentry of a hard disk drive assembly, to reduce settling time and provide accurate head positioning.

2. Background Information

Hard disk drives include a plurality of magnetic transducers that can write and read information by magnetizing and sensing the magnetic field of a rotating disk(s), respectively. The information is typically formatted into a plurality of sectors that are located within an annular track. The are a number of tracks located across each surface of the disk. A number of vertically similar tracks are sometimes referred to as a cylinder. Each track may therefore be identified by a cylinder number.

Each transducer is typically integrated into a slider that is incorporated into a head gimbal assembly (HGA). Each HGA is attached to an actuator arm. The actuator arm has a voice coil located adjacent to a magnet assembly which together define a voice coil motor. The hard disk drive typically includes a driver circuit and a controller that provide current to excite the voice coil motor. The excited voice coil motor rotates the actuator arm and moves the transducers across the surfaces of the disk(s).

When writing or reading information the hard disk drive may perform a seek routine to move the transducers from one cylinder (track) to another cylinder. During the seek routine the voice coil motor is excited with a current to move the transducers to the new cylinder location on the disk surfaces. The controller also performs a servo routine to insure that the transducer moves to the correct cylinder location.

Many disk drives utilize a "bang-bang" control loop for the servo routine to insure that the transducer is moved to the correct location. The shape of the current waveform for seek routines that utilize bang-bang control theory is typically square. Unfortunately, square waveforms contain high frequency harmonics which stimulate mechanical resonance in the HGA causing acoustic noise.

It is always desirable to minimize the amount of time required to write and read information from the disk(s). Therefore, the seek routine performed by the drive should move the transducers to the new cylinder location in the shortest amount of time. Additionally, the settling time of the HGA should be minimized so that the transducer can quickly write or read information, once located adjacent to the new cylinder.

The mechanical resonance created by the square waveforms of the prior art tend to increase both the settling and overall time required to write or read information from the disk. It would therefore be desirable to provide a seek routine that minimizes the mechanical resonance of the HGA, thereby decreasing acoustic noise and reducing settling time.

SUMMARY OF THE INVENTION

One embodiment of the present invention is a hard disk drive which moves a transducer across a disk surface so that the transducer has an essentially sinusoidal acceleration trajectory. The essentially sinusoidal acceleration trajectory of the transducer may reduce the excitation of mechanical resonance of a head gimbal assembly embodying the transducer, to reduce acoustic noise in the HGA and other componentry of the hard disk drive. Reduction of acoustic noise reduces settling time and provides accurate positioning of the transducer relative to a desired track of the disk.

DETAILED DESCRIPTION

One embodiment of the present invention is a hard disk drive which moves a transducer across a disk surface so that the transducer has an essentially sinusoidal acceleration trajectory. The transducer may be integrated into a slider that is incorporated into a head gimbal assembly (HGA). The head gimbal assembly may be mounted to an actuator arm which can move the transducer across the disk surface. The movement of the actuator arm and the transducer may be controlled by a controller. The controller may move the transducer from a present track to a new track in accordance with a seek routine and a servo control routine.

During the seek routine the controller may move the transducer in accordance with a sinusoidal acceleration trajectory. The sinusoidal trajectory may reduce the high harmonics found in square waveforms of the prior art, and minimize the mechanical resonance and thus the acoustic noise of the head gimbal assembly. Reducing the acoustic noise of the HGA may reduce the settling time of the transducer for reducing the duration of the seek routine. Reducing the acoustic noise may also provide accurate positioning of the transducer relative to a desired track of the disk.

Figure 1:
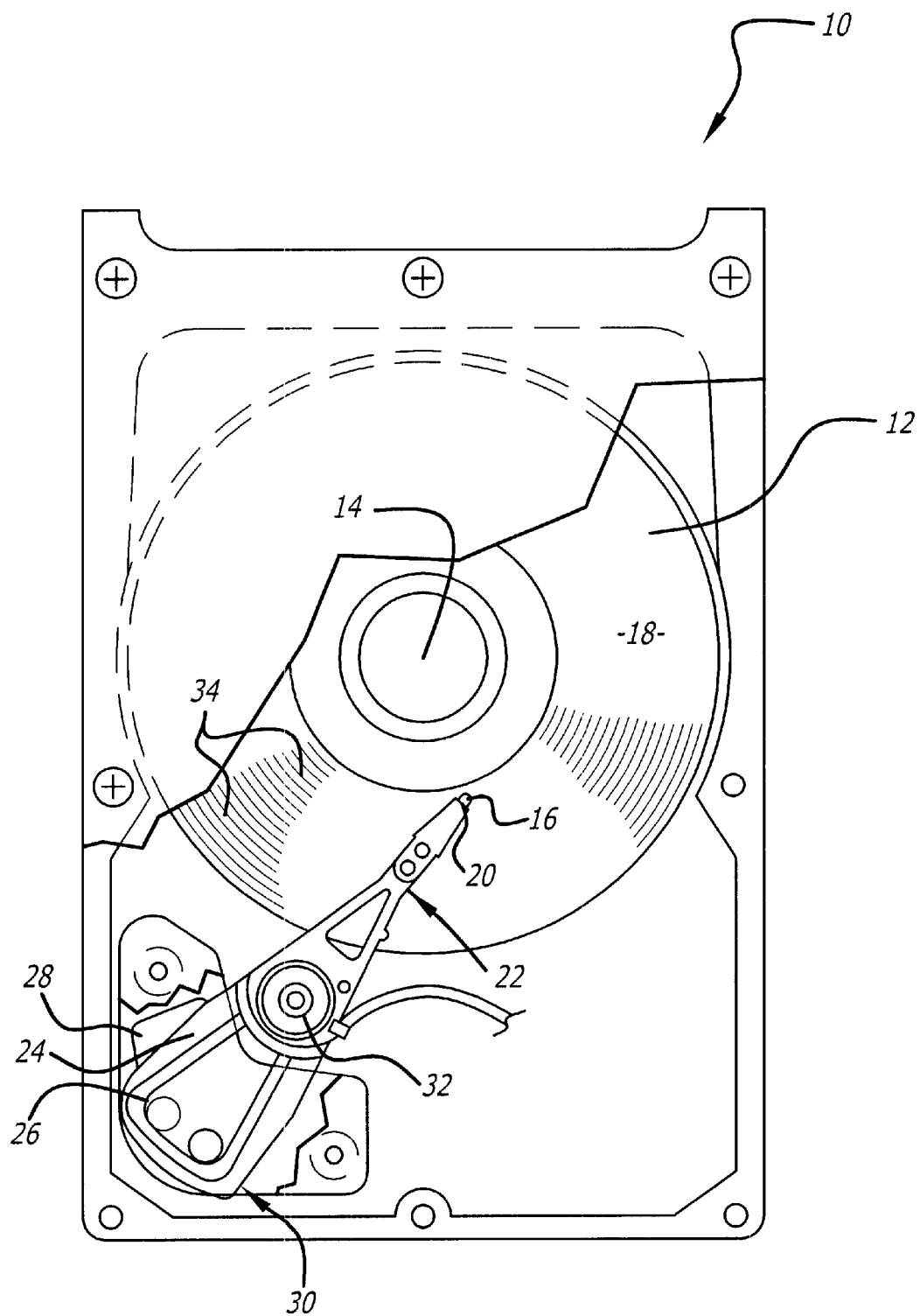
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spin motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM)

30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain grey code information which identifies the sector and track (cylinder). The transducer 16 is moved across the disk surface 18 to write or read information on a different track. Moving the transducer to access a different track is commonly referred to as a seek routine.

Figure 2:
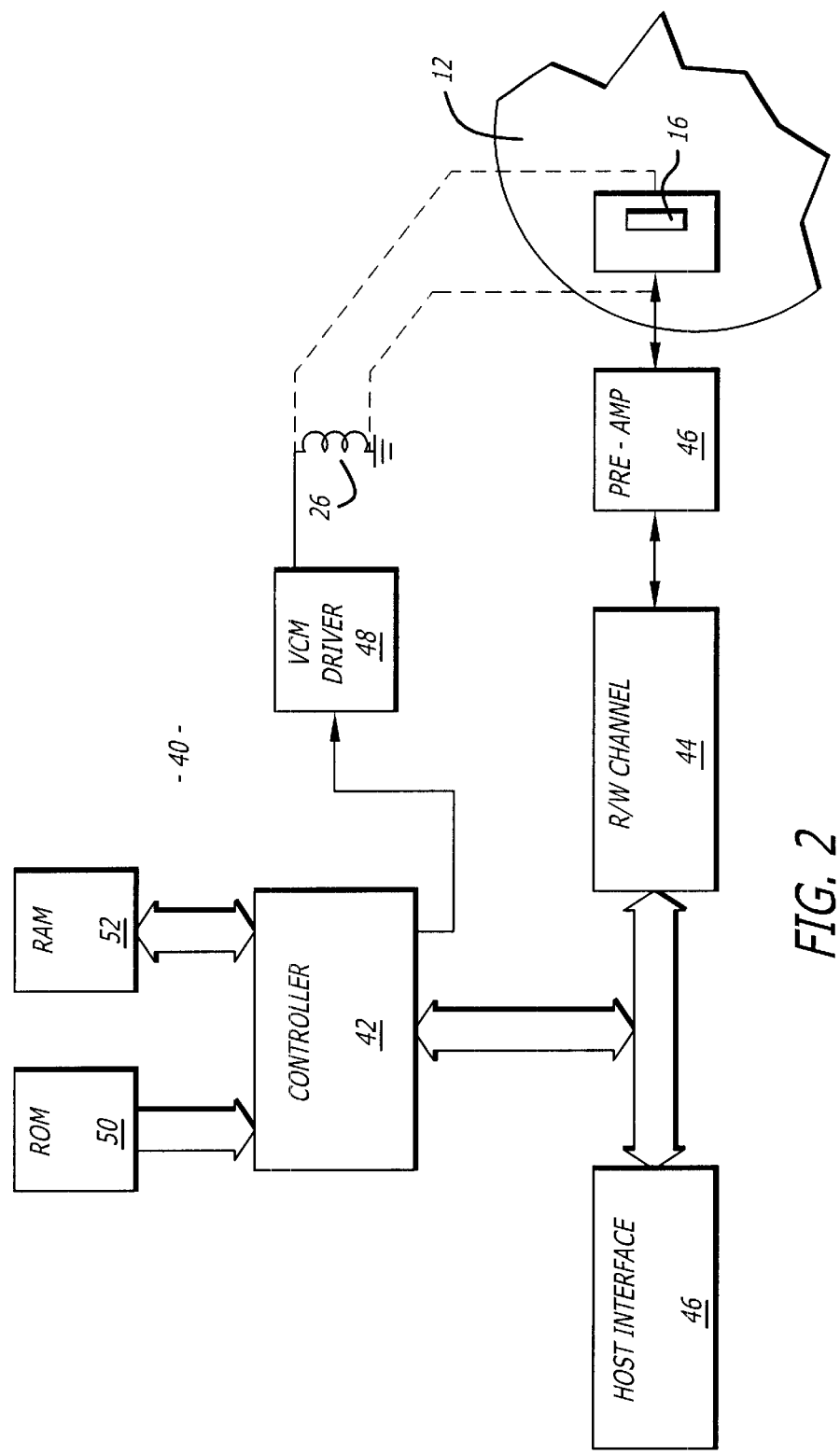
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP). The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a read only memory (ROM) device 50 and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track.

Figure 3:
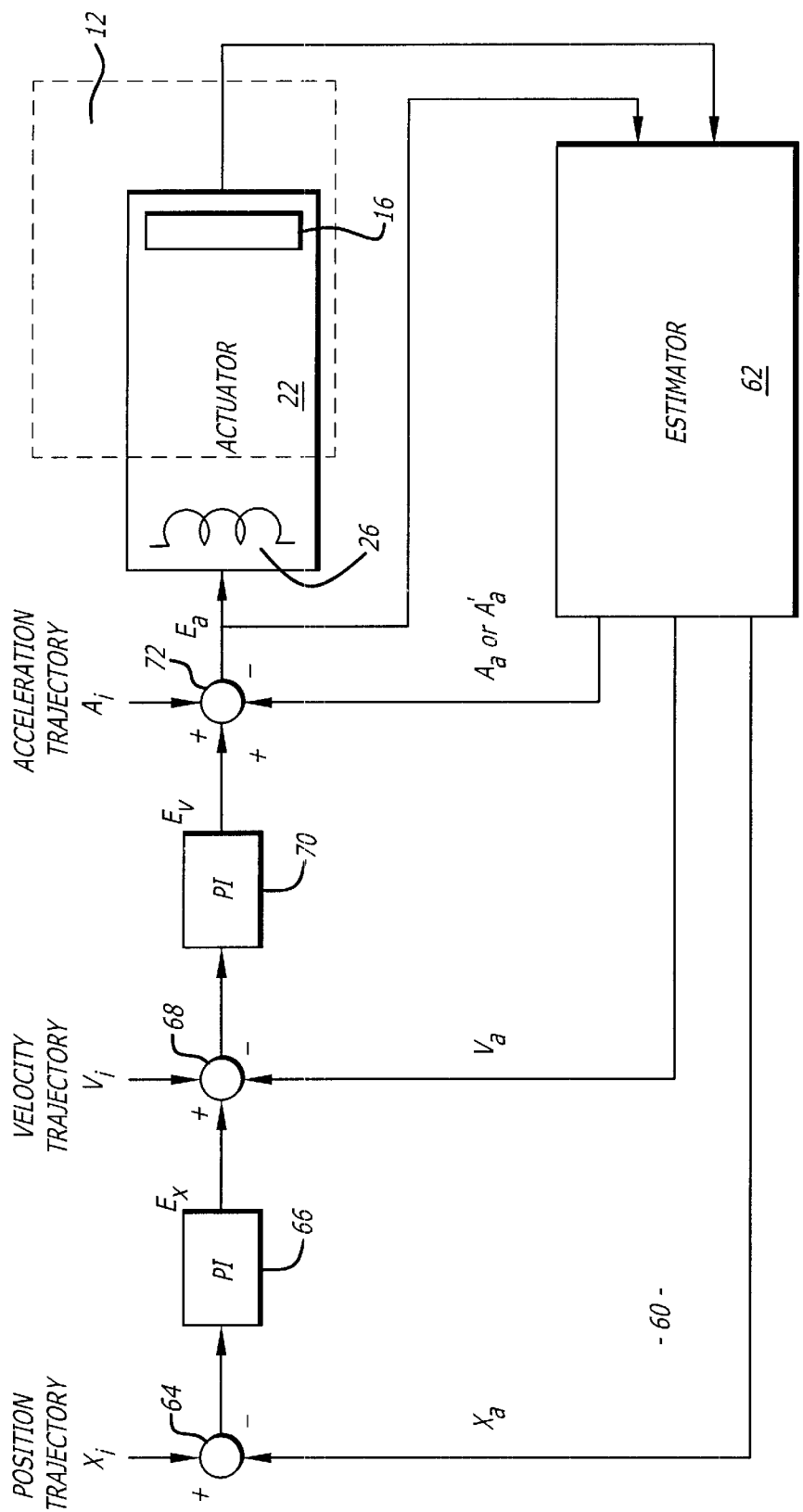
FIG. 3 is a schematic of a servo control system of the disk drive.

FIG. 3 shows a servo control system 60 that is implemented by the controller 42. The servo control system 60 insures that the transducer 16 is accurately located on a desired track of the disk 12. When the controller performs a seek routine the transducer 16 is moved from a first track to a new track located a distance $X_{SK}$ from the first track. The grey codes of the tracks located between the new and first tracks are read as the transducer 16 moves across the disk 16. This allows the controller to periodically determine whether the transducer 16 is moving at a desired speed or acceleration, or both, across the disk surface.

The control system 60 includes an estimator 62 that can determine the actual distance or position $X_a$ that the transducer has moved from the first track. The position can be determined by reading the grey code of a track beneath the transducer 16. The estimator 62 can also determine the actual velocity $V_a$ and actual acceleration $A_a$ of the transducer 16. The grey codes can be periodically sampled as the transducer 16 moves to the new track location so that the controller can correct the movement of the transducer 16 with the servo control 60.

The controller 42 computes an ideal position $X_i$, an ideal velocity $V_i$ and an ideal acceleration $A_i$ of the transducer 16 each time the transducer reads the grey code of a track 34. The controller computes the difference between the ideal position $X_i$ and the actual position $X_a$ at summing junction 64. In block 66 the controller then computes a position correction value $E_x$ with a proportional plus integral control algorithm and the output of the summing junction 64.

The actual velocity $V_a$ is subtracted from the sum of the ideal velocity $V_i$ and the position correction value $E_x$ at summing junction 68. In block 70 the controller computes a velocity correction value $E_v$ with a proportional plus integral control algorithm and the output of the summing junction 68.

An acceleration correction value $E_a$ is computed by subtracting the actual acceleration $A_a$ from the sum of the ideal acceleration $A_i$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A'_a$. The feedforward acceleration value $A'_a$ can be provided to summing junction 72 to provide a feedforward control loop.

Figure 4A:
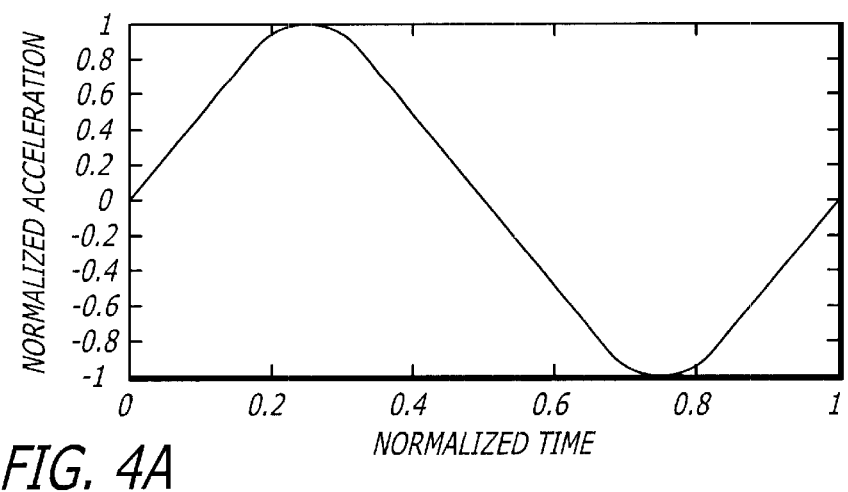
FIGS. 4a–c are graphs which show an acceleration trajectory, a velocity trajectory, and a position trajectory of a transducer of the disk drive of the present invention.
Figure 4B:
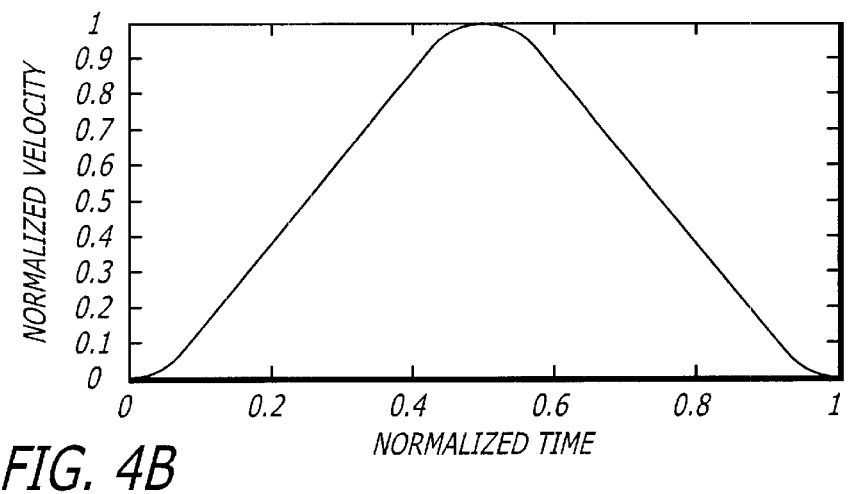
Figure 4C:
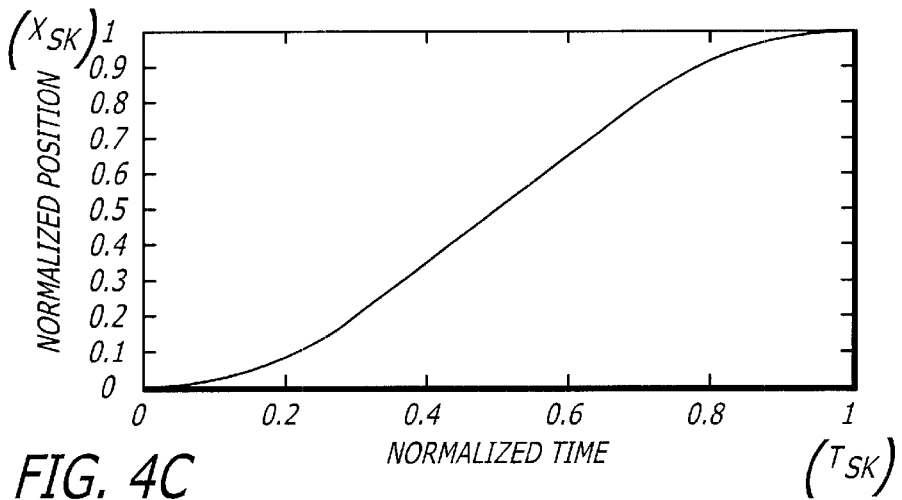

The ideal acceleration provided at the summing junction 72 preferably corresponds to the sinusoidal waveform shown in FIG. 4a. The corresponding ideal velocity and position waveforms are shown in FIGS. 4b and 4c, respectively. The sinusoidal waveform may be defined by the following equation:

$$a(t) = K_A I_M \sin\left(\frac{2\pi}{T_{SK}} t\right) \tag{1}$$

where;
$K_A$=acceleration constant;
$I_M$=maximum current provided to the voice coil;
$T_{SK}$=seek time required to move the transducer from the old track to the new track;
The following ideal velocity equation can be derived by integrating the acceleration equation.

$$v(t) = \int_0^t a(t)dt = K_A I_M \frac{T_{SK}}{2\pi}\left[1 - \cos\left(\frac{2\pi}{T_{SK}} t\right)\right] \tag{2}$$

The following ideal position equation can be derived by integrating the velocity equation.

$$x(t) = \int_0^t v(t)dt = K_A I_M \frac{T_{SK}}{2\pi}\left[t - \frac{T_{SK}}{2\pi}\sin\left(\frac{2\pi}{T_{SK}} t\right)\right] \tag{3}$$

When the disk drive is in operation, the disk drive may receive a command to store or read information. The command may require that the transducer be moved from a first track to a new track in accordance with a seek routine. During a seek routine the new track and corresponding distance (seek length $X_{SK}$) to the new track from the first track can be determined by the controller. The seek time may be initially computed before the ideal acceleration, ideal velocity and ideal position are computed. The following relationship between $T_{SK}$ and $X_{SK}$ can be generated from equation (3) by setting $t=T_{SK}$.

$$T_{SK} = \sqrt{\frac{2\pi X_{SK}}{K_A I_M}} \tag{4}$$

Instead of performing a square root operation, the controller can compute $T_{SK}$ from $X_{SK}$ by generating a number of sample points N between t=0 and t=$T_{SK}$ and using the following linear interpolation algorithm to determine the seek time between sample points.

$$T_{SK} = T_{SK}^l + \frac{T_{SK}^{l+1} - T_{SK}^l}{X_{SK}^{l+1} - X_{SK}^l}(X_{SK} - X_{SK}^l), \quad (5)$$

During the servo routine the system may take a number of samples which correlate to the different positions, velocities, and accelerations of the transducer as the transducer moves from one track to another track. It is desirable to discretize the ideal trajectories to correspond with the sampling of grey codes so that the actual values can be subtracted from the ideal values at the summing junctions of the servo control shown in FIG. 3. To discretize the trajectories, equations (1); (2) and (3) are transformed into a sample domain (n) and equation (4) is substituted into the amplitude terms to generate the following equations.

$$a(n) = \frac{2\pi X_{SK}}{N_{SK}^2 T_{SM}^2} \sin\left(\frac{2\pi}{N_{SK}} n\right) \quad (6)$$

$$v(n) = \frac{X_{SK}}{N_{SK} T_{SM}} \left[1 - \cos\left(\frac{2\pi}{N_{SK}} n\right)\right], \quad (7)$$

$$x(n) = \frac{X_{SK}}{N_{SK}} n - \frac{X_{SK}}{2\pi} \sin\left(\frac{2\pi}{N_{SK}} n\right) \quad (8)$$

where;
$T_{sm}$=the sampling time, computed from equation (5);
$N_{SK}$=the total number of samples;
n=sample number.

The sine and cosine values can be computed by utilizing look-up tables that are stored in memory. Alternatively, the sine and cosine values can be computed with the state equation and initial value of the following recursive sine wave generation algorithm.

$$\begin{bmatrix} x_c(n+1) \\ x_s(n+1) \end{bmatrix} = \begin{bmatrix} \cos\left(\frac{2\pi}{N_{SK}}\right) & -\sin\left(\frac{2\pi}{N_{SK}}\right) \\ \sin\left(\frac{2\pi}{N_{SK}}\right) & \cos\left(\frac{2\pi}{N_{SK}}\right) \end{bmatrix} \begin{bmatrix} x_c(n) \\ x_s(n) \end{bmatrix}, \quad (9)$$

$$\begin{bmatrix} x_c(0) \\ x_s(0) \end{bmatrix} = \begin{bmatrix} M \\ 0 \end{bmatrix},$$

which utilizes the following known trigonometric identities.

$$\cos\left(\frac{2\pi}{N_{SK}}(n+1)\right) = \cos\left(\frac{2\pi}{N_{SK}}\right)\cos\left(\frac{2\pi}{N_{SK}}n\right) - \sin\left(\frac{2\pi}{N_{SK}}\right)\sin\left(\frac{2\pi}{N_{SK}}n\right) \quad (10)$$

$$\sin\left(\frac{2\pi}{N_{SK}}(n+1)\right) = \sin\left(\frac{2\pi}{N_{SK}}\right)\cos\left(\frac{2\pi}{N_{SK}}n\right) - \cos\left(\frac{2\pi}{N_{SK}}\right)\sin\left(\frac{2\pi}{N_{SK}}n\right) \quad (11)$$

During the servo routine the controller computes the ideal position, ideal velocity and ideal acceleration of the transducer at a first sample time, determines the actual position, velocity and acceleration values and then processes the data in accordance with the control loop shown in FIG. 3 and described above. Second, third, etc. samples are taken and the process is repeated to provide a servo routine that controls the movement of the transducer.

The velocity of the transducer should not exceed a maximum value so that the transducer can accurately read grey codes from the disk. From equation (2) the maximum velocity can be computed as follows:

$$V_{MAX} = K_A I_M \frac{T_{SK}}{\pi} \quad (12)$$

Using equation (4) the maximum seek time and maximum seek length can be determined as follows.

$$T_{SK}^M = \frac{\pi}{K_A I_M} V_{MAX} \quad (13)$$

$$X_{SK}^M = \frac{\pi}{2 K_A I_M} V_{MAX}^2 \quad (14)$$

When the seek length $X_{SK}$ exceeds the maximum seek length $$X_{SK}^M,$$

a coast period must be introduced where the acceleration of the transducer is zero, so that the transducer velocity does not exceed the maximum value. The coast time can be defined by the following equation.

$$T_{CST} = \frac{X_{SK} - X_{SK}^M}{V_{MAX}} \quad (15)$$

For a seek length greater than $$X_{SK}^M$$

the ideal position, ideal velocity and ideal acceleration trajectories may be defined in (n) domain by the following equations.

$$a(n) = \frac{2\pi 2 X_{ACC}}{N_{SK}^{M2} T_{SM}^2} \sin\left(\frac{2\pi}{N_{SK}^M} n\right) \quad (16)$$

$$v(n) = \frac{2 X_{ACC}}{N_{SK}^M T_{SM}} \left[1 - \cos\left(\frac{2\pi}{N_{SK}^M} n\right)\right] \quad (17)$$

$$x(n) = \frac{2 X_{ACC}}{N_{SK}^M} n - \frac{2 X_{ACC}}{2\pi} \sin\left(\frac{2\pi}{N_{SK}^M} n\right) \quad (18)$$

when the transducer is accelerating;

$$a(n) = 0 \quad (19)$$

$$V(n) = V_{MAX} \quad (20)$$

$$x(n) = X_{ACC} + V_{MAX} T_{SM} (n - N_{SK}^M / 2) \quad (21)$$

when the transducer is coasting;

$$a(n) = \frac{2\pi 2 X_{DEC}}{N_{SK}^{M2} T_{SM}^2} \sin\left(\frac{2\pi}{N_{SK}^M}(n - N_{CST})\right) \quad (22)$$

$$v(n) = \frac{2 X_{DEC}}{N_{SK}^M T_{SM}} \left[1 - \cos\left(\frac{2\pi}{N_{SK}^M}(n - N_{CST})\right)\right] \quad (23)$$

-continued $$x(n) = X_{ACC} + X_{CST} + \frac{2X_{DEC}}{N_{SK}^M}(n - N_{CST} - N_{SK}^M/2) - \frac{2X_{DEC}}{2\pi}\sin\left(\frac{2\pi}{N_{SK}^M}(n - N_{CST})\right) \quad (24)$$

when the transducer is decelerating
where;

$$X_{CST} = T_{CST}V_{MAX} \text{ for } T_{CST} \text{ at coast phase,} \quad (25)$$

$$X_{ACC} = (X_{SK} - X_{CST})/2 \text{ for } T_{SK}^M/2 \text{ at acceleration phase,} \quad (26)$$

$$X_{DEC} = X_{SK} - X_{ACC} - X_{CST} \text{ for } T_{SK}^M/2 \text{ at deceleration phase,} \quad (27)$$

When the seek length exceeds $$X_{SK}^M$$

the controller computes the ideal position, ideal velocity and ideal acceleration in accordance with equations (15) through (27), and then utilizes the ideal values in the control loop of FIG. 3.

The present invention provides a seek routine wherein the transducer is moved in an essentially sinusoidal acceleration trajectory and a servo control loop that corrects the input current so that the transducer moves in a desired path.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk which has a surface;
    a spin motor that rotates said disk;
    a transducer which can write information onto said disk and read information from said disk;
    an actuator arm to move said transducer across said surface of said disk from a first position to a second position that are separated by a distance; and,
    a controller that performs recursive sine wave generation algorithms to control said actuator arm so that said transducer moves across said disk surface with an essentially sinusoidal acceleration trajectory.

2. The hard disk drive of claim 1, wherein said controller is a digital signal processor.

3. The hard disk drive of claim 2, wherein said digital signal processor controls said actuator arm in accordance with a linear interpolation algorithm.

4. The hard disk drive of claim 1, wherein said controller performs a servo routine that includes the steps of determining an actual position of said transducer, computing an ideal position of said transducer, and generating a position correction value that is a function of said actual and ideal positions, said position correction value being used to vary the movement of said transducer.

5. The hard disk drive of claim 4, wherein said servo routine includes the steps of determining an actual velocity of said transducer, computing an ideal velocity of said transducer, and generating a velocity correction value that is a function of said position correction value, said ideal velocity and said actual velocity, said velocity correction value being used to vary the movement of said transducer.

6. The hard disk drive of claim 5, wherein said servo routine includes the steps of determining an actual acceleration of said transducer, computing an ideal acceleration of said transducer, and generating an acceleration correction value that is a function of said velocity correction value, said ideal acceleration and said actual acceleration, said acceleration correction value being used to vary the movement of said transducer.

7. The hard disk drive of claim 6, wherein said acceleration correction value is also a function of a feedforward acceleration value provided in a feedforward control loop.

8. The hard disk drive of claim 4, wherein said position correction value is a function of a proportional plus integral control algorithm.

9. The hard disk drive of claim 10, wherein said velocity correction value is a function of a proportional plus integral control algorithm.

10. The hard disk drive of claim 1, wherein the trajectory includes a period wherein said transducer has an essentially zero acceleration.

11. A method for moving a transducer across a surface of a disk, comprising:
    a) exciting an actuator arm that is coupled to the transducer so that the transducer moves across the disk surface;
    b) calculating a further movement of the transducer using a recursive sine wave generation algorithm; and,
    c) moving the transducer the calculated movement.

12. The method of claim 11, further comprising the steps of computing an ideal position of the transducer, determining an actual position of the transducer, computing a position correction value from the ideal and actual positions, and varying the movement of the transducer with the position correction value.

13. The method of claim 12, wherein the position correction value is computed with a proportional plus integral control algorithm.

14. The method of claim 12, further comprising the steps of computing an ideal velocity of the transducer, determining an actual velocity of the transducer, computing a velocity correction value from the ideal velocity, the actual velocity and the position correction value, and varying the movement of the transducer with the velocity correction value.

15. The method of claim 14, further comprising the steps of computing an ideal acceleration of the transducer, determining an actual acceleration of the transducer, computing an acceleration correction value from the ideal acceleration, the actual acceleration and the velocity correction value, and varying the movement of the transducer with the acceleration correction value.

16. The method of claim 15, wherein the acceleration correction value is a function of a feedforward acceleration value.

17. The method of claim 17, wherein the ideal acceleration, the ideal velocity and the ideal position are computed with a linear interpolation algorithm.

18. The method of claim 12, wherein the velocity correction value is computed with a proportional plus integral control algorithm.

19. The method of claim 11, wherein the trajectory includes a period wherein the transducer has an essentially zero acceleration.

20. A hard disk drive, comprising:
    a disk which has a surface;
    a spin motor that rotates said disk;

a transducer which can write information onto said disk and read information from said disk;

an actuator arm to move said transducer across said surface of said disk; and, a controller that controls said actuator arm in accordance with a sinusoidal acceleration trajectory, said controller to execute a servo routine that includes determining an actual position of said transducer, computing an ideal position of said transducer, generating a position correction value that is a function of said actual and ideal positions, determining an actual velocity of said transducer, computing an ideal position of said transducer, generating a velocity correction value that is a function of said position correction value, said ideal velocity and said actual velocity, determining an actual acceleration of said transducer, generating a feedforward acceleration value that is a function of said actual acceleration value, computing an ideal acceleration of said transducer, generating an acceleration correction value that is a function of said velocity correction value, said feedforward acceleration value and said ideal acceleration, said acceleration correction value being used to vary the movement of said transducer, comparing said ideal velocity to a maximum velocity, said ideal position, said ideal velocity and said ideal acceleration being computed with recursive sine wave generation algorithms.

21. The hard disk drive of claim 20, wherein said controller is a digital signal processor.

22. The hard disk drive of claim 20, wherein said digital signal processor controls said actuator arm in accordance with a linear interpolation algorithm.

23. The hard disk drive of claim 20, wherein said ideal position and velocity correction values are computed from proportional plus integral control algorithms.

24. A method for moving a transducer across a surface of a disk according to a sinusoidal acceleration trajectory, comprising:

a) moving the transducer across the disk surface;

b) computing an ideal position of the transducer with a recursive sine wave generation algorithm;

c) determining an actual position of the transducer;

d) generating a position correction value that is a function of the ideal position and the actual position;

e) computing an ideal velocity of the transducer with a recursive sine wave generation algorithm;

f) determining an actual velocity of the transducer;

g) generating a velocity correction value that is a function of the ideal velocity, the actual velocity and the position correction value;

h) computing an ideal acceleration of the transducer with a recursive sine wave generation algorithm;

i) determining an actual acceleration of the transducer;

j) generating a feedforward acceleration value that is a function of the actual acceleration value;

k) generating an acceleration correction value that is a function of the velocity correction value, the feedforward acceleration value and the ideal acceleration;

l) varying the movement of the transducer in response to the generation of the acceleration correction value;

m) comparing said idea velocity to a maximum velocity.

25. The method of claim 24, wherein the position correction value and the velocity correction value are computed with a proportional plus integral control algorithm.

26. The method of claim 24, wherein the ideal acceleration, the ideal velocity and the ideal position are computed with a linear interpolation algorithm.

* * * * *